Jan. 8, 1924.
A. ROBECHAUD
EMERGENCY SPINDLE FOR AUTOMOBILES
Filed Nov. 26, 1921
1,480,223
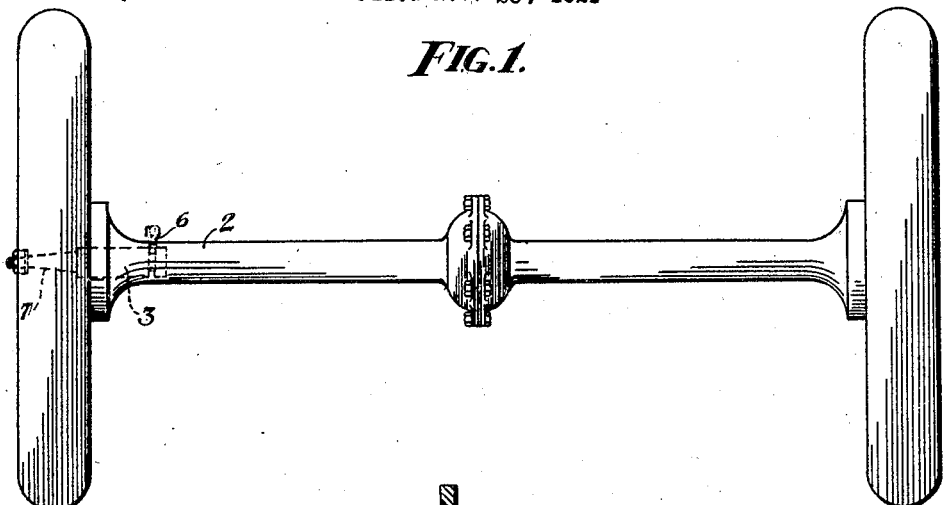
FIG.1.
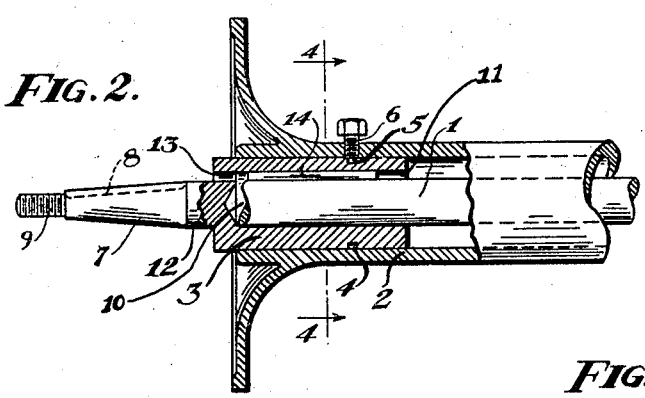
FIG.2.
FIG.3.
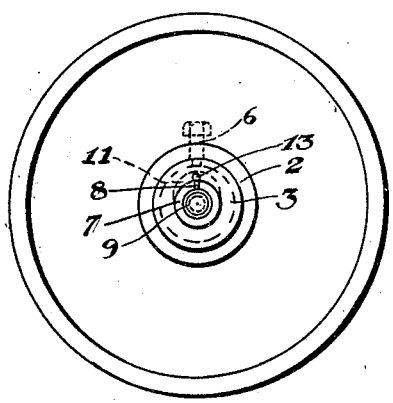
FIG.4.
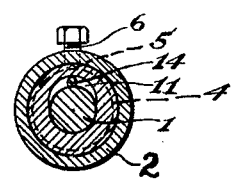
INVENTOR.
Alcide Robechaud
BY
Erwin Wheeler & Woodard
ATTORNEYS.

Patented Jan. 8, 1924.

1,480,223

UNITED STATES PATENT OFFICE.

ALCIDE ROBECHAUD, OF MILWAUKEE, WISCONSIN.

EMERGENCY SPINDLE FOR AUTOMOBILES.

Application filed November 26, 1921. Serial No. 518,088.

*To all whom it may concern:*

Be it known that I, ALCIDE ROBECHAUD, a citizen of the United States, residing at Milwaukee, county of Milwaukee, and State of Wisconsin, have invented new and useful Improvements in Emergency Spindles for Automobiles, of which the following is a specification.

This invention relates to emergency spindles for automobiles and is particularly directed to a spindle which may be used in an emergency to replace a portion of a broken axle, thereby permitting the automobile to be driven under its own power from the place of the accident to the desired spot.

Frequently automobiles break the external portion of their rear axle, and heretofore it has been found necessary to call a wrecking car to carry the automobile to a garage for repairs. Frequently difficulty is experienced in getting the needed assistance after an accident of this type, and a needless delay is occasioned. In addition to this it is an expensive operation to take the crippled car to the garage.

It is to overcome these delays and expenses that the present invention is designed, and it is therefore an object of this invention to provide an emergency spindle which may be quickly substituted for the broken portion of the axle to thereby permit the car to be driven under its own power to the repair shop.

Further objects are to provide an emergency spindle for automobiles which may be readily and operatively positioned; which may be securely retained in position, both with respect to the rear axle housing and with respect to the axle; and which may be positioned and adjusted by a non-skilled person.

Further objects are to provide an emergency spindle which necessitates the use of a minimum number of parts; which may be cheaply and readily manufactured; and which is of simple and sturdy design, readily co-operating with standard automobile equipment.

An embodiment of the invention is shown in the accompanying drawing, in which:—

Figure 1 is a view of the rear housing and the rear wheels with the emergency spindle in position.

Figure 2 is an enlarged sectional view through the emergency spindle and associated parts, with the wheel removed.

Figure 3 is an end view of the spindle secured in the housing.

Figure 4 is a sectional view on line 4—4 of Figure 2.

The invention has been shown as applied to a Ford, although it may readily be applied to any type of car. As is well known, the rear axle 1 usually breaks just within the rear housing 2, as illustrated in Figure 2 in the drawings.

In applying the emergency spindle, the roller bearings (not shown) are removed and the hollow portion 3 of the spindle is slipped over the projecting end of the broken rear axle, and occupies the place normally occupied by the roller bearing. It will be seen from the drawings that the hollow portion 3 of the spindle is cylindrical and is provided with an external groove 4 within which the reduced portion 5 of a screw 6 is positioned. A convenient way of positioning this screw 6 is to remove the oil cup and utilize this threaded opening as illustrated in Figure 2.

The outer end of the spindle has a tapered portion 7 which co-operates with the hub of the wheel and is provided with a keyway 8 for the usual locking key and with a projecting threaded portion 9 for the nut. This portion is substantially similar to the corresponding portion of the usual rear axle and may therefore co-operate with the hub of the wheel in the same manner as such rear axle.

In order to operatively couple the axle 1 with the portion 3 of the spindle, such portion is provided with a cylindrical opening 10 adapted to receive the projecting end of the axle and with an eccentric recessed portion 11 forming an addition to the cylindrical portion 10. This recessed portion 11 may conveniently be bounded by the surface of a cylinder whose axis is eccentric to the axis of the main cylindrical opening 10. This opening 10 with its eccentric offset terminates adjacent the forward or outer portion of the hollow member 3 to leave material at such point to form an integral connecting portion 12 for the hollow portion 3 and the tapered portion 7. A relatively small hole 13 is drilled through the portion 12 and communicates with the eccentric recess 11.

When it is desired to use the emergency spindle, the roller bearing and the oil cup are removed, and the hollow portion 3 of the spindle is slipped over the projecting end of the axle 1 and a screw 6 positioned as illustrated in Figure 2, thereby rotatively retaining the spindle within the housing 2. A cylindrical pin 14 is slipped through the opening 13 and passed into the eccentric recess 11. When the axle 1 is now rotated, the pin 14 rolls into wedging position between the surface of the recess 11 and the outer periphery of the axle 1, and thereby positively and firmly locks the axle to the emergency spindle.

It will be seen that this means of locking the spindle to the axle is such that the car may be driven in either direction as desired, and that the gripping will increase in proportion to the torque. It will also be seen that this spindle is admirably adapted for use upon ordinary types of cars, and the particular manner of holding the spindle in position with relation to the housing, permits the free use of the usual brakes, brake bands, and brake casing, which have been omitted from the drawing for the sake of clearness. In this connection it is called to attention that the securing means is locked upon the housing at a slight distance inwardly from the brakes, and therefore does not in any manner interfere with the brakes.

While this device is intended primarily for emergency use, experiments have proven it to be practicable for long distances. It might be thought that the pin 14 might slip axially from recess 11 and become lost. Such is not the case, however. Apparently there are no forces which come into play to move pin 14 longitudinally of the axle. Exhaustive tests have demonstrated that there is no need for any means for securing the pin against such movement.

I claim:

1. In combination, an automobile axle and housing therefor, an emergency spindle having a hollow portion adapted to loosely receive a portion of the axle and to be freely positioned thereon, said emergency spindle having an external groove formed therein, a screw passing through said housing and cooperating with said groove to retain the emergency spindle in correct position relative to said housing, and means including a wedge pin wholly receivable within the hollow portion of the spindle and adapted to be applied after the positioning of said spindle to lock said spindle to said axle.

2. In combination, an automobile axle and housing therefor, a spindle having a hollow portion adapted to receive a portion of the axle and having an eccentric recess merging into said hollow portion, and an externally opening hole in communication with said eccentric recess, a pin adapted to be inserted through said hole and positioned within said eccentric recess, and means for retaining the spindle in position within said housing.

3. An emergency spindle for a broken axle of an automobile, said spindle comprising a relatively large cylindrical portion adapted to be received in the axle housing of said automobile and having an opening adapted to receive a portion of the axle, and having an eccentrically positioned recess merging into said opening, and an opening passing outwardly through said spindle and in communication with said eccentrically arranged recess; a projecting portion having means for co-operating with an automobile wheel hub; and means for retaining the spindle in position within said housing.

4. An emergency spindle adapted to fit within an axle housing and to constitute a repair for a broken axle shaft therein, said spindle comprising a wheel receiving element, a sleeve connected therewith adapted to be received into said housing and provided with an interior surface conforming in size and shape with the axle shaft for approximately one-half of its circumference, the remaining portion of the interior of said sleeve being eccentric to the axle shaft and accessible from the exterior of the sleeve, a pin adapted to be introduced into the eccentric portion of said sleeve between the sleeve and an axle therein and to confine the axle within the portion of the sleeve conforming thereto, said wheel receiving element being aligned with an axle so confined, means for retaining the spindle in position within said housing.

ALCIDE ROBECHAUD.